United States Patent
Janzen

(10) Patent No.: US 12,466,613 B2
(45) Date of Patent: Nov. 11, 2025

(54) TRANSPORT BAG FOR HANGING TRANSPORT OF CONVEYING GOOD AS WELL AS AN UNLOADING STATION, A CLOSING STATION, AND A CONVEYING INSTALLATION FOR THESE TRANSPORT BAGS

(71) Applicant: SSI Schäfer Automation GmbH (AT), Graz (AT)

(72) Inventor: Paul Janzen, Bielefeld (DE)

(73) Assignee: SSI Schäfer Automation GmbH (AT), Graz (AT)

( * ) Notice: Subject to any disclaimer, the term of this patent is extended or adjusted under 35 U.S.C. 154(b) by 49 days.

(21) Appl. No.: 18/569,657

(22) PCT Filed: May 30, 2022

(86) PCT No.: PCT/EP2022/064647
§ 371 (c)(1),
(2) Date: Dec. 13, 2023

(87) PCT Pub. No.: WO2022/263160
PCT Pub. Date: Dec. 22, 2022

(65) Prior Publication Data
US 2024/0270447 A1  Aug. 15, 2024

(30) Foreign Application Priority Data

Jun. 17, 2021  (DE) .................... 10 2021 003 096.6

(51) Int. Cl.
*B65D 33/14* (2006.01)
*B65B 69/00* (2006.01)
(Continued)

(52) U.S. Cl.
CPC .......... *B65D 33/14* (2013.01); *B65B 69/0008* (2013.01); *B65D 29/00* (2013.01); *B65D 33/02* (2013.01); *B65D 33/16* (2013.01)

(58) Field of Classification Search
CPC ........ B65D 33/14; B65D 29/00; B65D 33/02; B65D 33/16; B65B 69/0008;
(Continued)

(56) References Cited

U.S. PATENT DOCUMENTS 4,306,399 A * 12/1981 Tsujimoto ............... B65B 43/30
53/385.1
4,783,949 A * 11/1988 Chopko ................... B65B 9/14
53/291

(Continued)

FOREIGN PATENT DOCUMENTS

DE  3206829 A1 * 9/1982 ............. B56G 17/20
DE  202017105508 U1 * 11/2017 ............. B65G 17/20
(Continued)

OTHER PUBLICATIONS

International Preliminary Report on Patentability for corresponding International Application No. PCT/EP2022/064647, mailed Dec. 28, 2023.
(Continued)

*Primary Examiner* — Anna K Kinsaul
*Assistant Examiner* — Mobeen Ahmed
(74) *Attorney, Agent, or Firm* — Jason H. Vick; Amped IP LLC

(57) ABSTRACT

A transport bag includes a closure device for detachably connecting the front wall to the rear wall in the closure state for receiving the conveying good and for releasing the connection from the closure state into the open state for releasing the conveying good. The locking of the closure device is performed with the aid of an electric drive. The
(Continued)

Figures 1, 2:
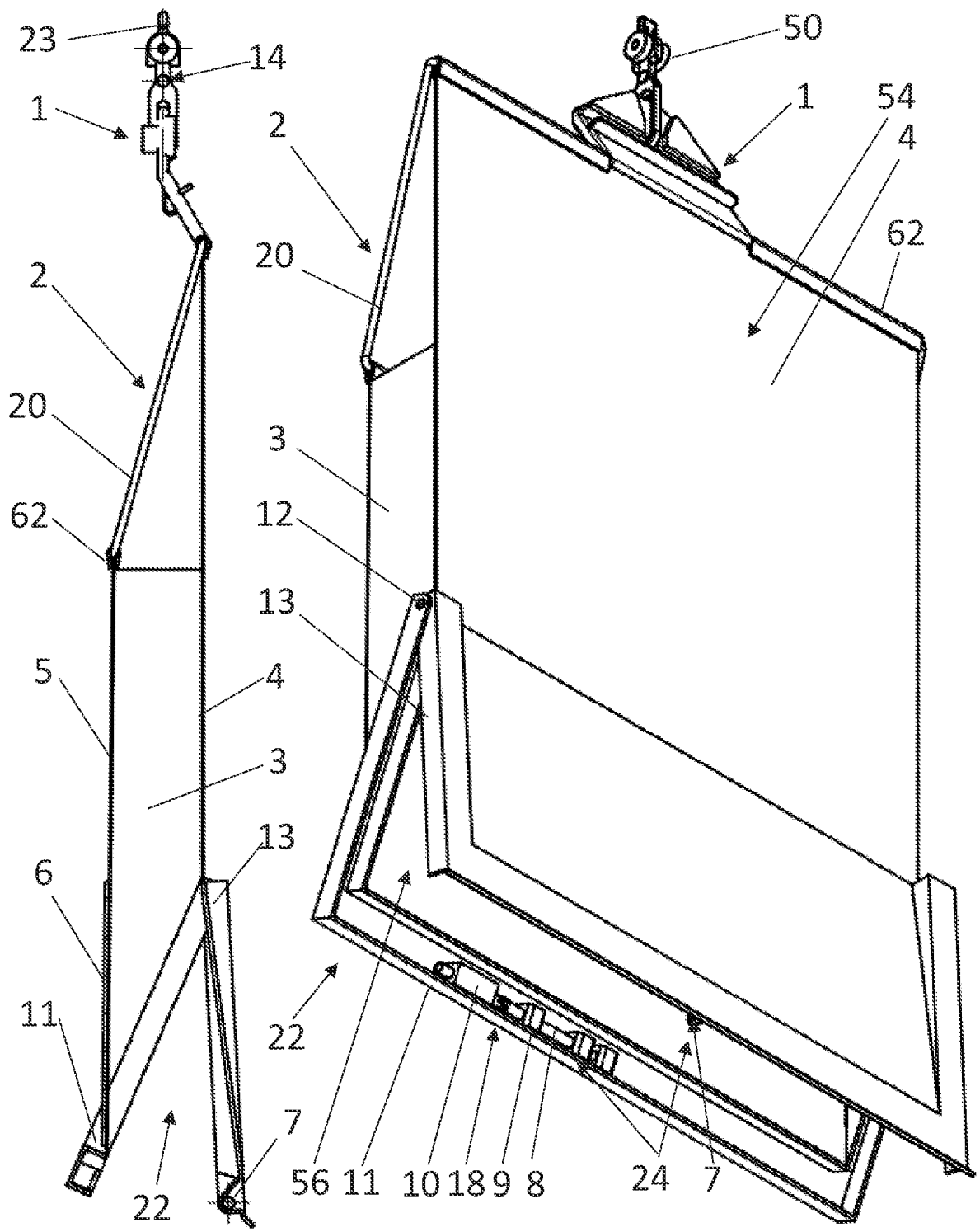

reversible closing lock is achieved with the aid of the spring of the solenoid. For the opening of the closure device, the solenoid is switched for a short time and the reversible closing lock is released. The switching takes place in the unloading station by supplying electric current to the electric contacts with the aid of the electric switching contacts of the unloading station.

14 Claims, 11 Drawing Sheets

(51) Int. Cl.
    *B65D 30/00*     (2006.01)
    *B65D 33/02*     (2006.01)
    *B65D 33/16*     (2006.01)

(58) Field of Classification Search
    CPC ..... B65B 43/465; B65B 43/123; B65B 43/30; B65G 9/002; B65G 47/61; B65G 19/025
    See application file for complete search history.

(56) References Cited

U.S. PATENT DOCUMENTS

| | | | |
|---|---|---|---|
| 5,489,017 | A | 2/1996 | Bonnet |
| 9,187,252 | B2 * | 11/2015 | Wend ..................... B65G 17/12 |
| 9,630,751 | B1 * | 4/2017 | Otto ....................... B65G 17/20 |
| 10,875,716 | B2 * | 12/2020 | Schönenberger ...... B65G 9/002 |
| 11,072,466 | B2 * | 7/2021 | Wend ................. B65D 33/1658 |
| 2011/0214967 | A1 * | 9/2011 | Wend ..................... B61B 10/025 198/687 |
| 2014/0284180 | A1 * | 9/2014 | Wend ..................... B65G 47/61 198/713 |
| 2015/0225177 | A1 * | 8/2015 | Schonenberger .... B65G 17/485 383/17 |
| 2017/0369248 | A1 * | 12/2017 | Fenile ................... B65G 19/025 |
| 2019/0241321 | A1 * | 8/2019 | Wend ................... B65G 19/025 |
| 2019/0367282 | A1 * | 12/2019 | Stauber .................. B65G 47/61 |
| 2020/0087073 | A1 * | 3/2020 | Schönenberger .... B65G 19/025 |
| 2020/0130952 | A1 * | 4/2020 | Eisenberg ............. B65B 43/465 |
| 2021/0323729 | A1 * | 10/2021 | Stribbling .............. B65D 85/36 |
| 2021/0327012 | A1 * | 10/2021 | Issing ................... G05D 1/0217 |
| 2022/0041316 | A1 * | 2/2022 | Ikeda ...................... B65B 43/12 |
| 2022/0315347 | A1 * | 10/2022 | Liu ..................... B65B 69/0083 |
| 2023/0242348 | A1 * | 8/2023 | Unterluggauer ... B65G 49/0459 414/815 |
| 2024/0116717 | A1 * | 4/2024 | Woodrough, Jr. ...... B65G 47/38 |
| 2024/0262628 | A1 * | 8/2024 | Langenbach .......... B65G 61/00 |
| 2024/0262631 | A1 * | 8/2024 | Janzen ................... B65G 19/02 |

FOREIGN PATENT DOCUMENTS

| | | | | |
|---|---|---|---|---|
| DE | 202019103850 U1 * | 8/2019 | ............ B65D 29/00 |
| DE | 102018213489 A1 | 2/2020 | |
| DE | 102021002833 A1 | 8/2021 | |
| EP | 2130968 A1 * | 12/2009 | ............ B07C 3/087 |
| EP | 2786940 A1 * | 10/2014 | ............ B65B 25/20 |
| EP | 3231741 A1 | 10/2017 | |
| EP | 3442884 B1 | 6/2021 | |
| FR | 2430363 A1 | 2/1980 | |
| JP | 2011-105499 A | 6/2011 | |

OTHER PUBLICATIONS

International Search Report (including translation) for corresponding International Application No. PCT/EP2022/064647, mailed Sep. 23, 2022.
Written Opinion for corresponding International Application No. PCT/EP2022/064647, mailed Sep. 23, 2022.

* cited by examiner

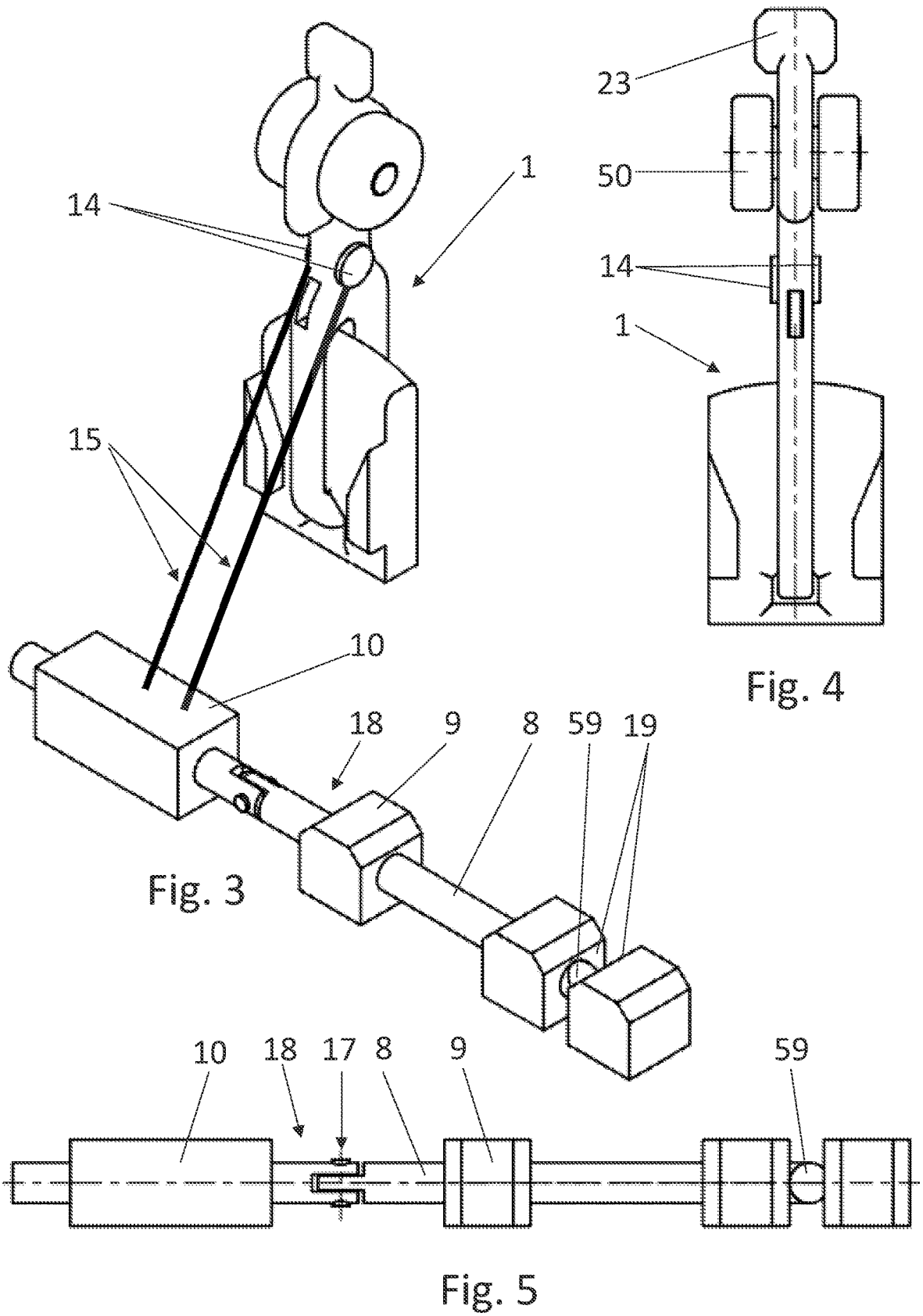

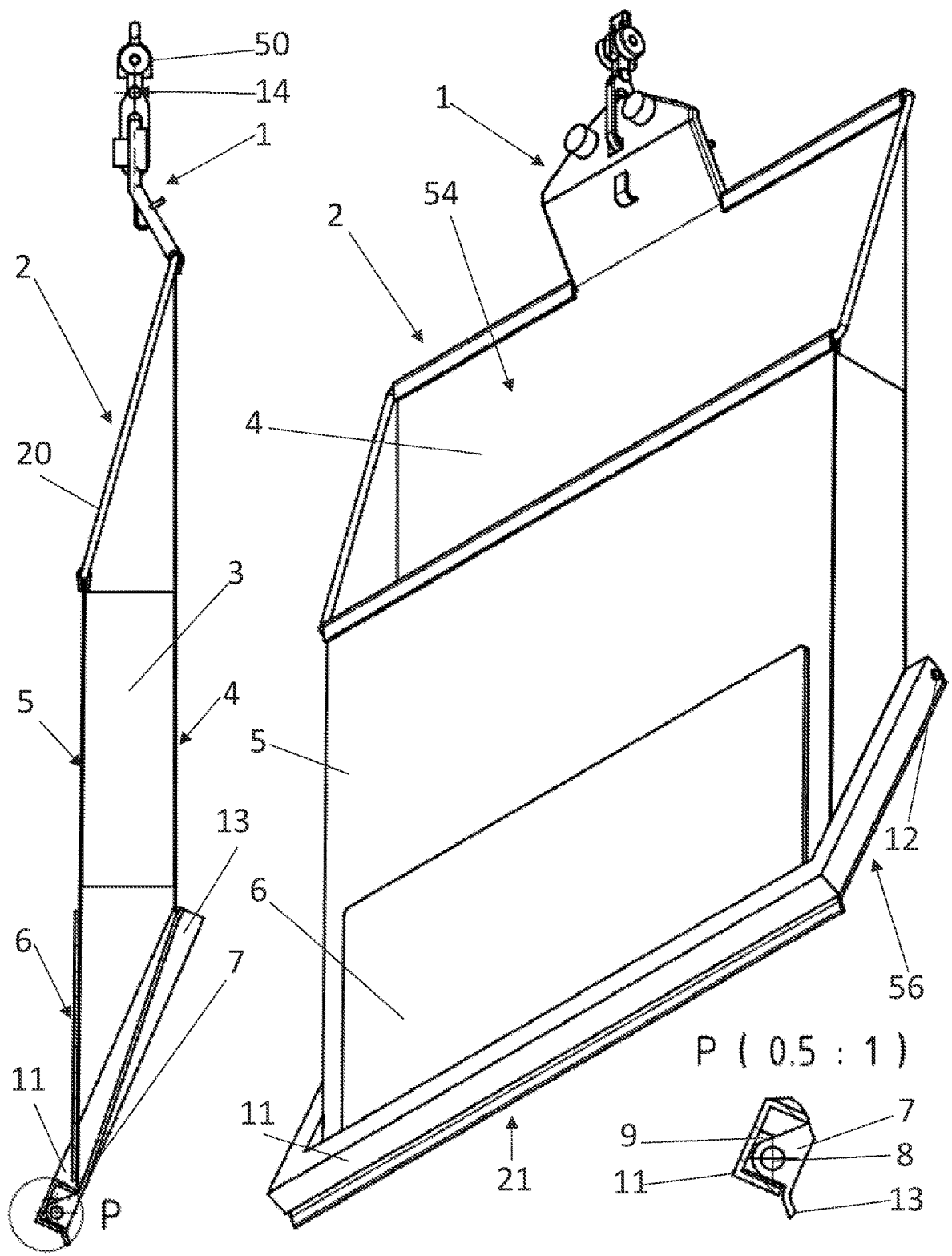

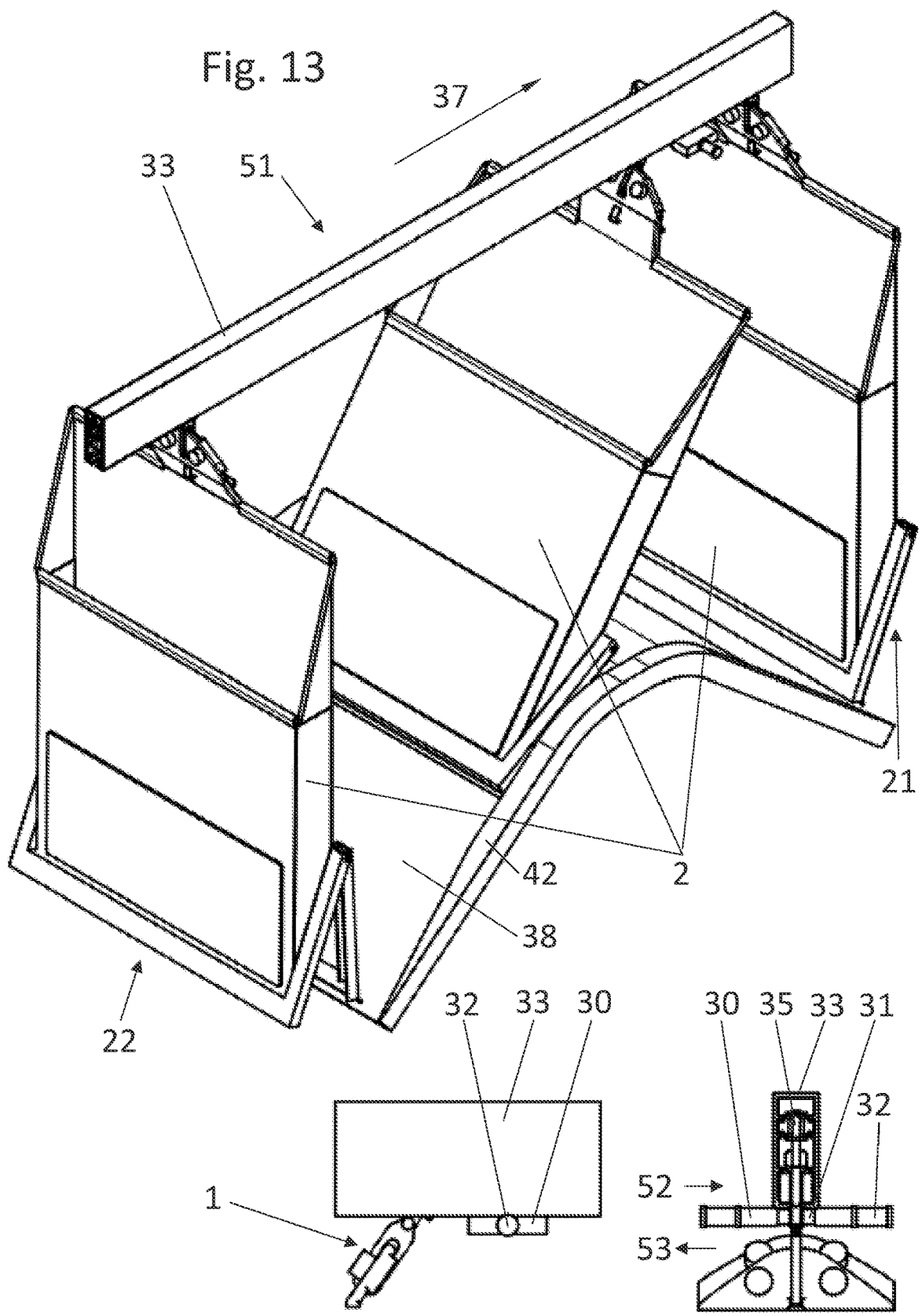

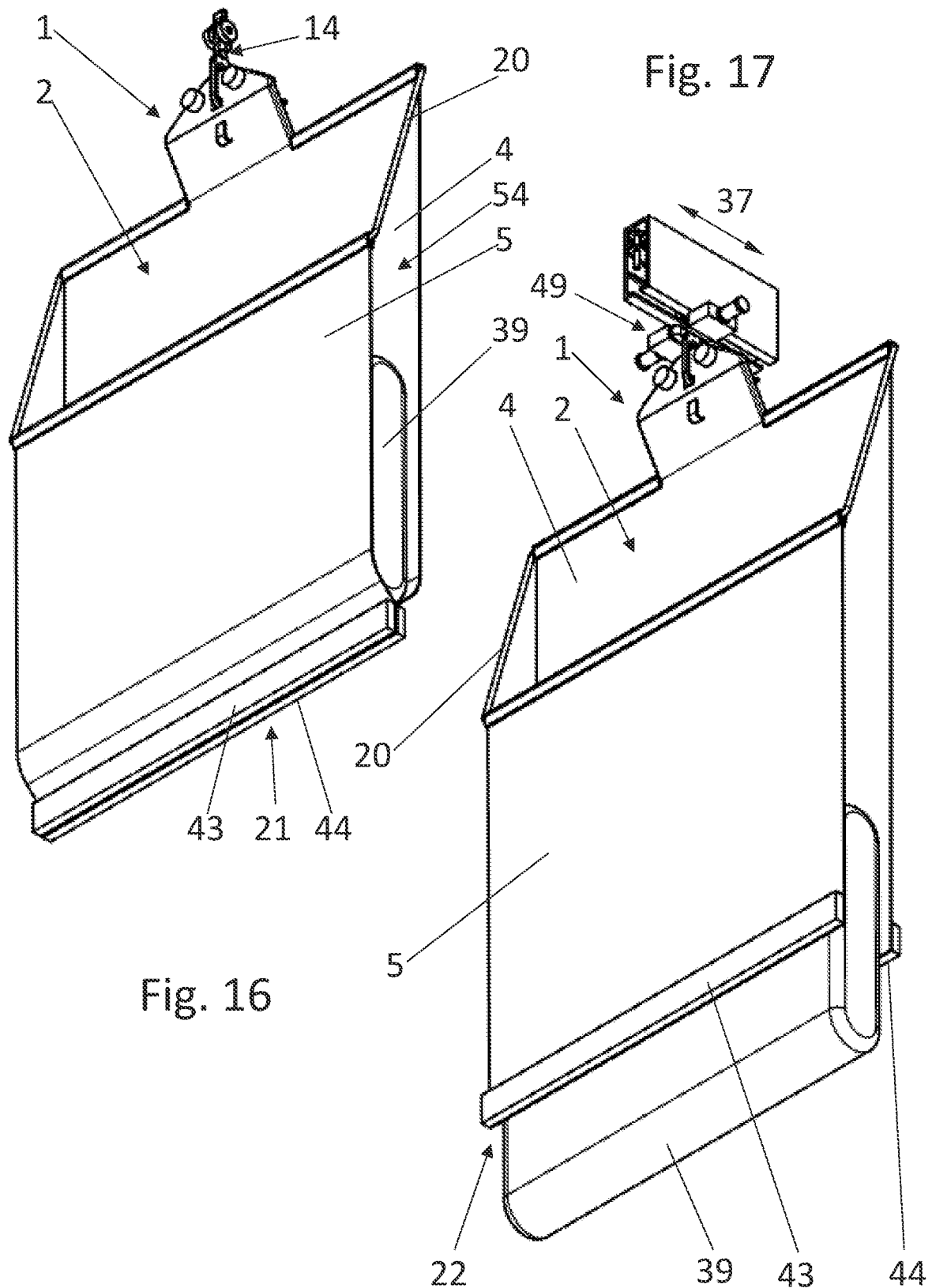

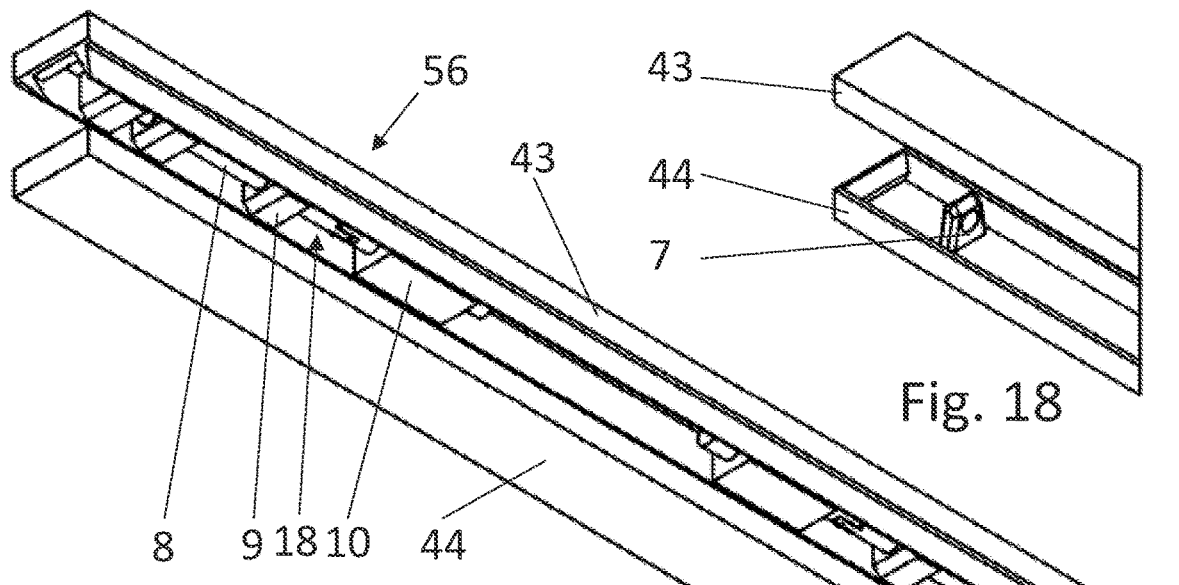
Fig. 18
Fig. 19
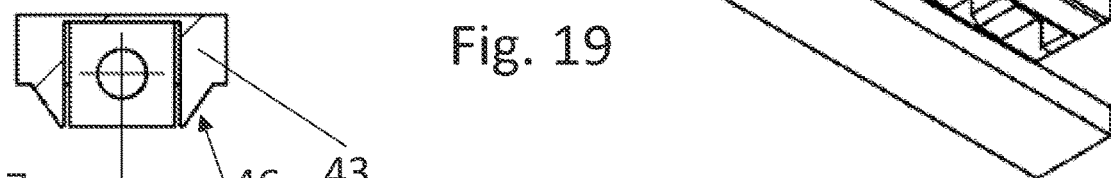
Fig. 20
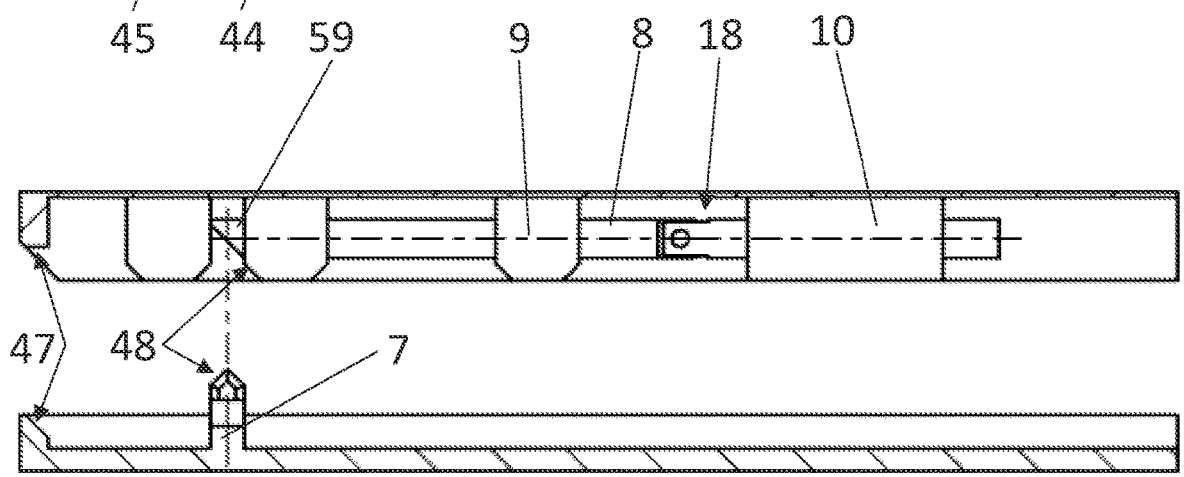
Fig. 21

TRANSPORT BAG FOR HANGING TRANSPORT OF CONVEYING GOOD AS WELL AS AN UNLOADING STATION, A CLOSING STATION, AND A CONVEYING INSTALLATION FOR THESE TRANSPORT BAGS

CROSS REFERENCE TO RELATED APPLICATIONS

This application is a national stage application under 35 U.S.C. 371 of PCT Application No. PCT/EP2022/064647 having an international filing date of 30 May 2022, which designated the United States, which PCT application claimed the benefit of German Application No. 10 2021 003 096.6, filed 17 Jun. 2021, each of which are incorporated herein by reference in their entirety.

The invention relates to transport bag for the hanging transport of conveying good according to the preamble of claim 1. Further, the invention relates to an unloading station and a closing station for such transport bags, as well as to a conveying installation including such station.

From EP 2 130 968 A1 a carrying device is known which comprises a support wall including a rigid front wall as well as a flexible rear wall, and a closure device for detachably connecting the front wall to the rear wall. For releasing the connection between the front wall and the rear wall the carrying device comprises an operating device including an operating means, which is spaced to the closure device, and a transferring means acting between the operating means and the closure device. The transferring means is arranged on a front side of the front wall and is formed as a rigid traction rod. To ensure free displacement of the transferring means, even when the carrying device is loaded with goods, the front wall is formed rigidly. By forming the front wall rigidly, the same is heavy and the maximum load capacity of the carrying device available for transporting the goods is reduced. Due to the limited flexibility of the front wall, an adaptation to the individual geometry of the goods is not possible either so that they are not sufficiently enclosed and can fall out of the carrying device due to transport-caused vibrations and start-up accelerations.

From EP 3 231 741 A1 a carrying device is known for receiving goods, which includes a support wall and a closure device. The support wall includes a front wall and a rear wall and is between a closure state, in which a carrying volume for receiving the goods is at least partially limited forwards, downwards and to the rear, and an open state, in which the carrying volume is to be arranged releasing downwards. The closure device comprises two closing means for reversibly connecting the front wall to the rear wall in the closure state. The two closing means are attached to the support wall. Upon releasing the goods from the carrying device, in particular goods of large dimensions can tilt between the support wall and one of the two closing means. This can lead to downtimes, and the goods can fall out of the carrying device remote from the intended unloading location, and get lost or damaged in the process.

From DE 202017105508 U1 a transport bag is known comprising a front wall, a rear wall, and a pivotable holding hanger, wherein the front wall and the rear wall respectively are connected articulated at their upper ends to the holding hanger, and wherein at the lower end of the front wall at least one coupling element is arranged, characterized in that a channel-like or trough-like base element (20; 120) with a first side wall and a second side wall is provided, wherein the first side wall is connected in an articulated manner to the rear wall, and the second side wall comprises at least one counter-coupling element interacting with at least one coupling element. The disadvantage of the transport bag is the lateral loading.

The known transport bags, including means for automatically unloading and closing, and the conveying installations for the transport bags are complex in structure, require complicated closing stations and unloading stations, are not sufficiently efficient, sometimes noisy, heavy and equipped with many additional safety systems for avoiding operational failures.

The invention is based on the object to develop further the transport bag for hanging transport of conveying goods and the conveying installation for the transport bag in such a manner that an efficient, construed with few parts, lightweight and foldable in the conveying direction transport bag is created, that can be transported in conveying installations, and that can be, without greater effort during the transport, automatically unloaded and closed in an uncomplicated manner, in particular at normal velocity of the sorting system of the conveying installation.

This object is solved in accordance with the invention by the features in the characterizing part of claim 1 and the dependent claims in that the transport bag comprises a closure device in the lower section for detachably connecting the front wall to the rear wall into the closure state for receiving the conveying good and for releasing the connection between the front wall and the rear wall from the closure state in the open state for releasing the conveying good downwards. The locking of the closure device takes place with the aid of an electric drive, which is preferably a low-cost solenoid including a spring return and a movable rod-shaped anchor. The solenoid is connected to electric lines by the electric contacts which preferably are sliding contacts and are located in the upper section of the suspension device. The locking is achieved by the aid of the spring of the solenoid. For the opening of the closure device the solenoid is switched for a short time, the locking is released, and the transport bag is unloaded. The switching takes place in the unloading station by supplying electric current to the electric contacts with the aid of the electric switching contacts of the unloading station, which extract to contact position towards the electric contacts and switch the solenoid by electric current so that the closure device opens. Further advantages are offered by the uncomplicated efficient closing transport bags with the aid of a lifting ramp. Additionally, the transport bag can be folded in the conveying direction and forms, in an unloaded state, a depth not substantially exceeding the depth of the transport coupling, and thus leads to the efficient utilization of the transport tracks.

Further features, advantages, and details of the invention result from the following description of embodiments and examples based on the drawings.

Figure 9:
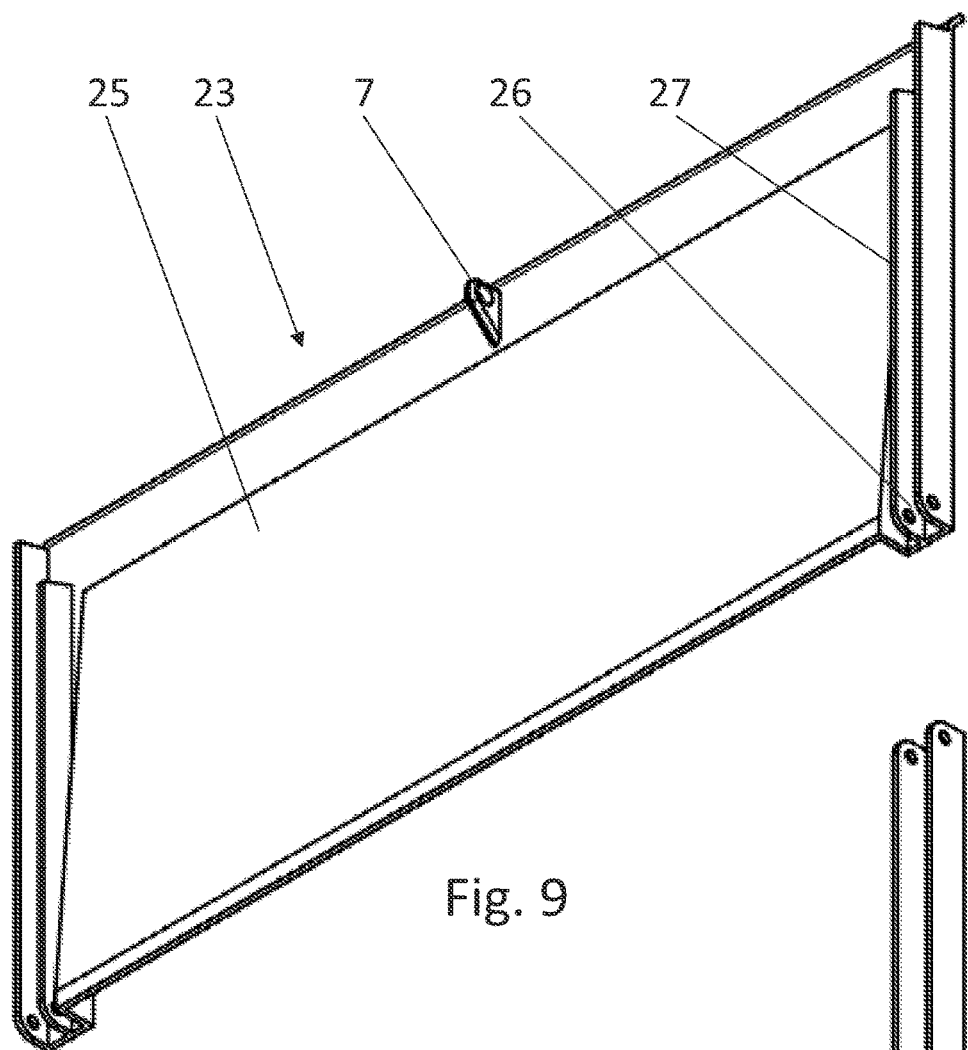
Figure 10:
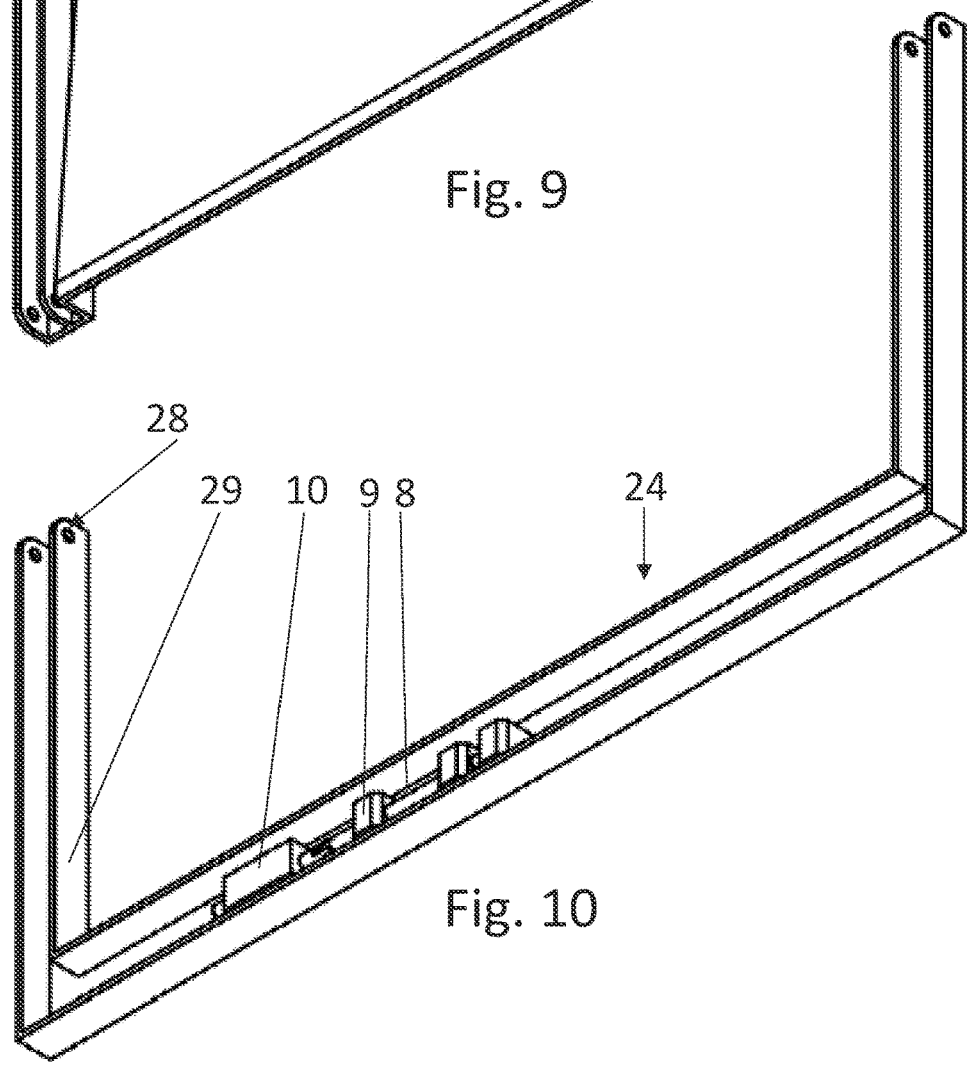
Figures 11, 12:
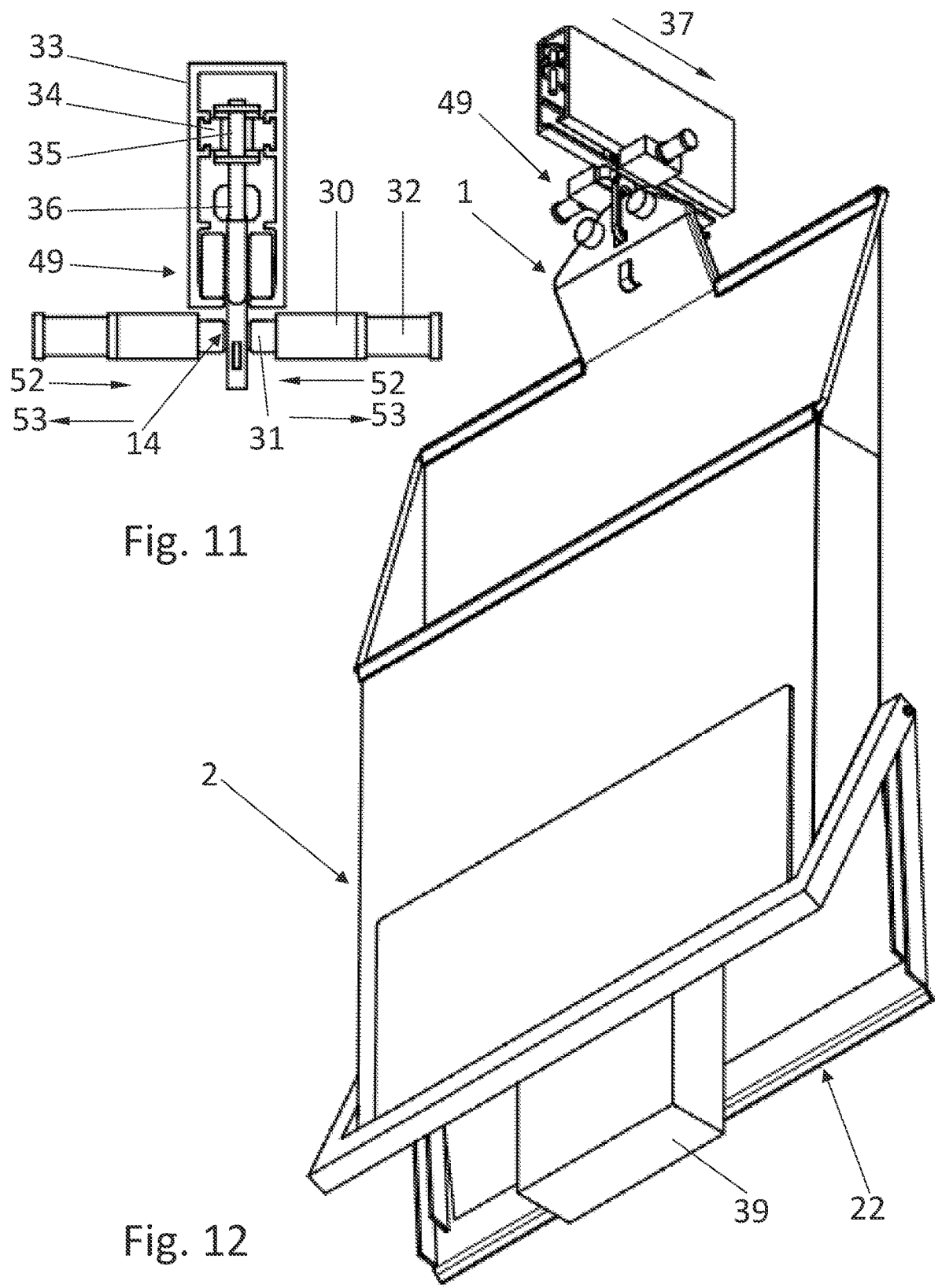
Figure 22:
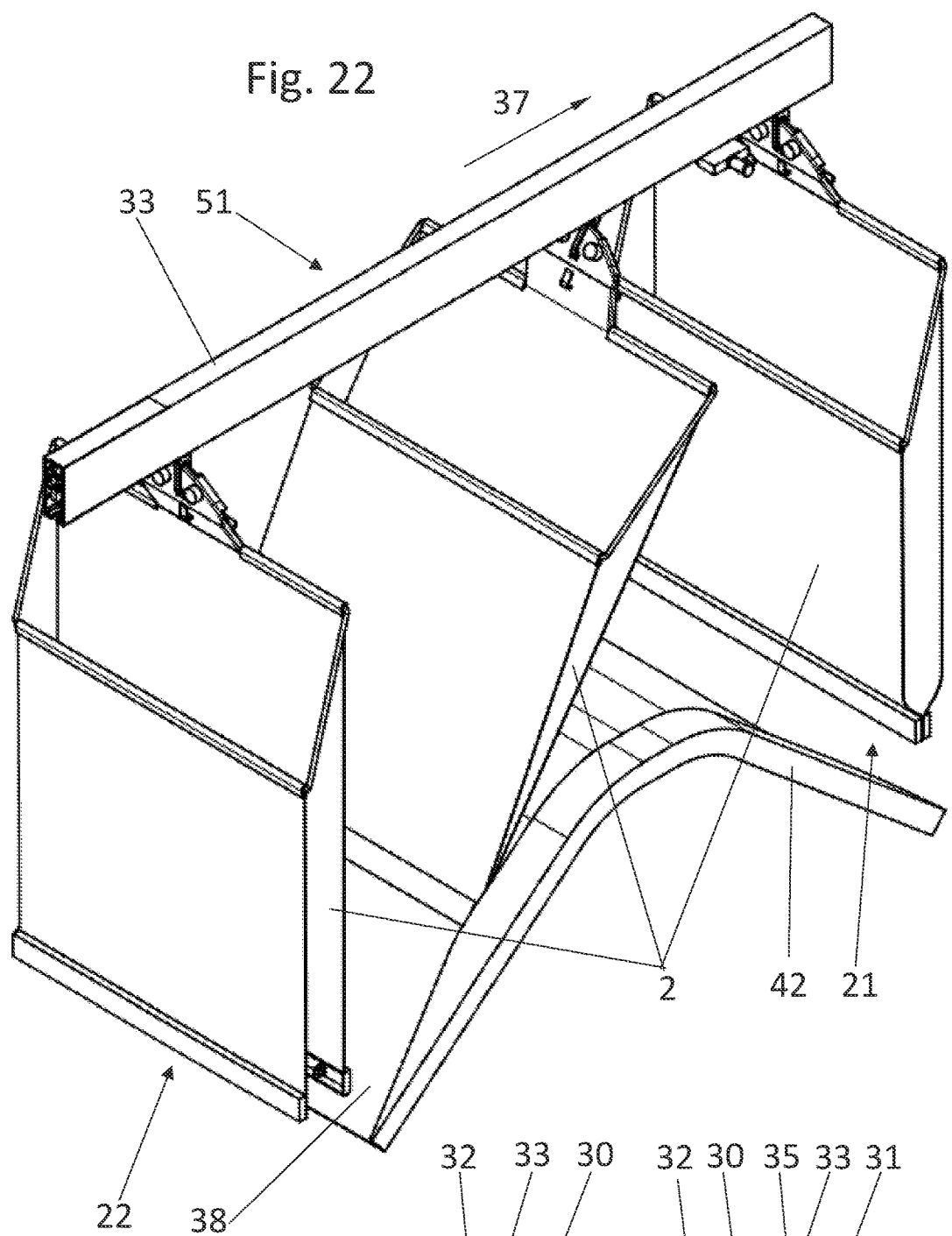
Figure 23:
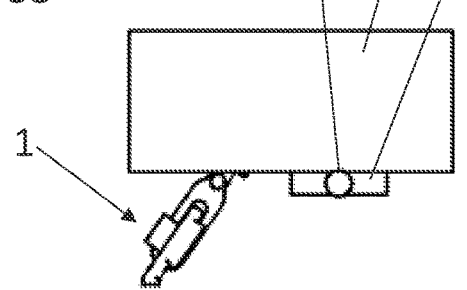
Figure 24:
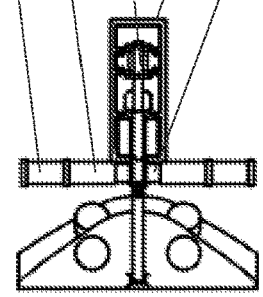
Figure 25:
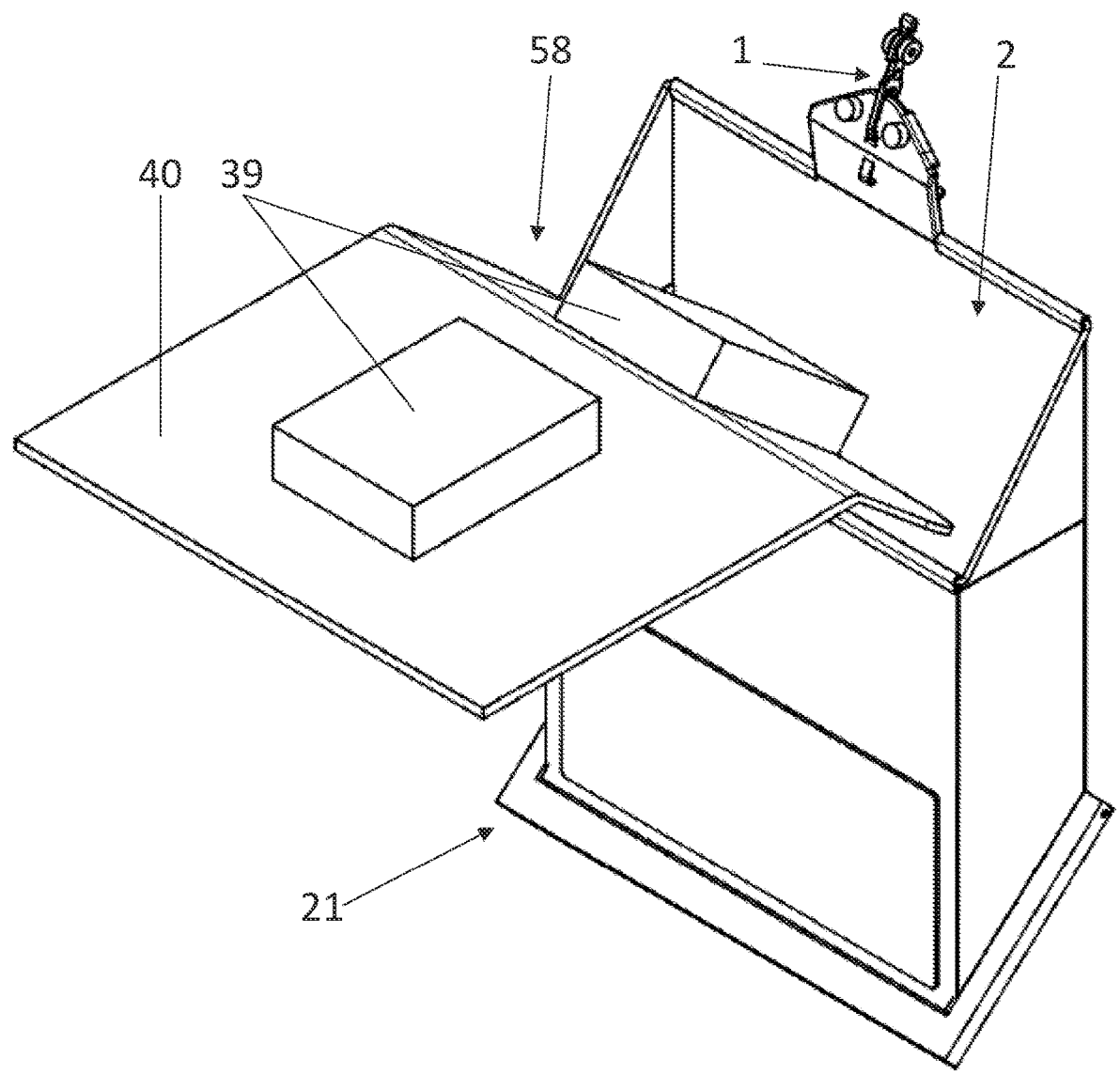
Figure 26:
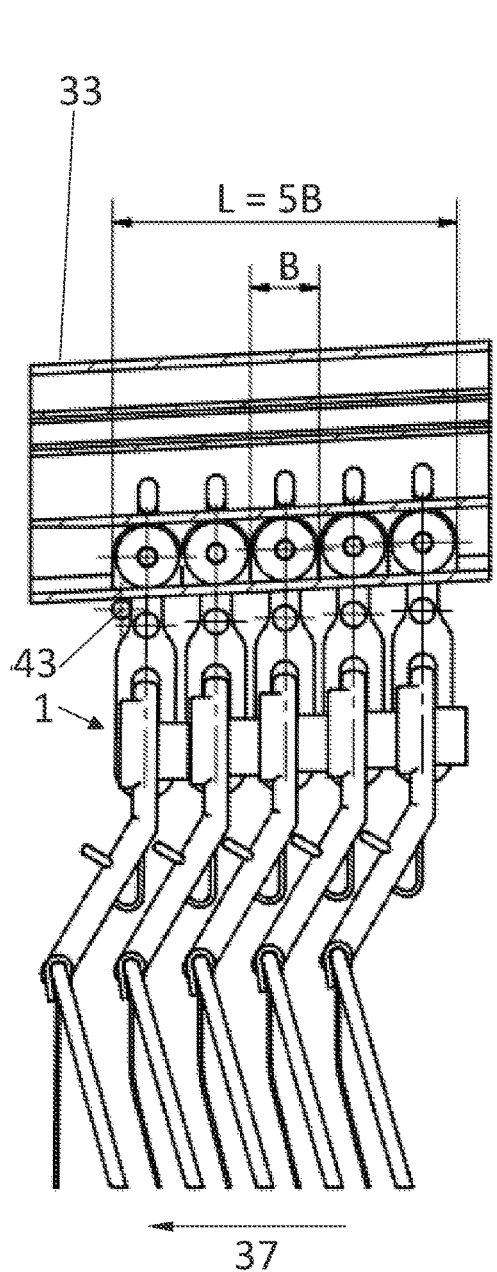
Figure 27:
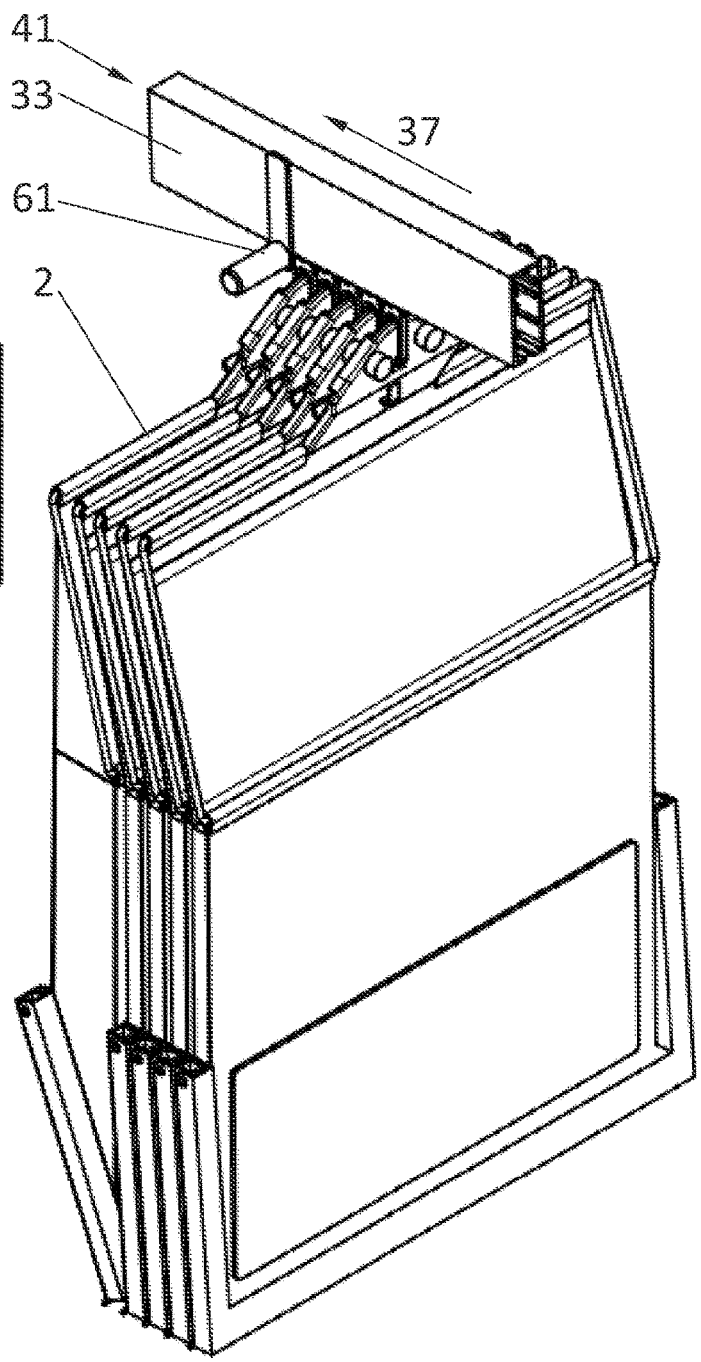

It is illustrated:

FIG. 1 a side view of the transport bag in the open state,

FIG. 2 a perspective front view of the transport bag in the open state,

FIG. 3 a perspective front view of the switching means and means for the control, FIG. 4 a front view of the transport coupling including the electric switching contacts, FIG. 5 a top view of the switching means, FIG. 6 a side view of the transport bag in the closure state, FIG. 7 a perspective rear view of the transport bag in the closure state, FIG. 8 a side view in section of the switching means, FIG. 9 a perspective top view of the front frame, FIG. 10 a perspective top view of the rear frame, FIG. 11 a front sectional view of the conveying installation and the unloading station, FIG. 12 a perspective rear view of the conveying installation and the unloading station, FIG. 13 a perspective rear view of the conveying installation and the closing station, FIG. 14 a side view of the closing station, FIG. 15 a front view of the conveying installation and the closing station, FIG. 16 a perspective rear view of the transport bags in the closure state, FIG. 17 a perspective rear view of the transport bag in the open state within the unloading station, FIG. 18 a perspective side view of a fragment of the linear closing elements, FIG. 19 a perspective side view of the linear closing elements, FIG. 20 a front view of the linear closing elements, FIG. 21 a side view of the linear closing elements, FIG. 22 a perspective rear view of the conveying installation and the closing station, FIG. 23 a side view of the closing station, FIG. 24 a front view of the conveying installation and the closing station, FIG. 25 a perspective front view of the loading station, FIG. 26 a side view of the empty transport bags in the conveying installation on an accumulation path including a stopper, FIG. 27 a perspective rear view of the empty transport bags in the conveying installation on the accumulation path including a stopper.

In FIGS. 1 to 5 a transport bag 2, which consists of a suspension device 1 including rollers 50 and a coupling 23 for transferring, in accordance with FIG. 11, the driving force of the conveying element 35, is illustrated in the open state 22. For the rest, it is referred to DE 102 021 002 833 A1, from which the suspension device 1 is already known. The transport bags 2 are supported in a shiftable manner on the rollers 50 in a transport rail 33. The loading frame 20 is installed in the lower section of the suspension device 1. The loading frame 20 is formed rectangular, and preferably consists of metal wire. The support wall 54, which is foldable in the conveying direction 37, is fixed on the loading frame 20 with the aid of seems, and secured by the protection strips 62. The support wall 54 consists of a front wall 4, a rear wall 5, and side walls 3, and is formed at least partially of flexible fabric. The fabric preferably is flame retardant and in particular halogen-free. The closure device 56 is located in the lower section of the transport bag 2 for detachably connecting the front wall 4 to the rear wall 5 into the closure state 21 for receiving the conveying good 39 and for releasing the connection between the front wall 4 and the rear wall 5 from the closure state 21 in the open state 22 for releasing the conveying good 39 downwards. The closure device 56 includes front frame 13 and rear frame 11 being pivotally connected to each other by hinges 12, and being foldable together for reversible generating a closure state 21, or an open state 22, of the transport bag 2. The front frame 13 is attached to the front wall 4. The rear frame 11 is attached, with the lower section 57, to the rear wall 5 and, by means of the lateral sections 29, to the side walls 3. The rear wall 5 includes, in the lower external section, a stabilizing plate 6 for preventing the loaded conveying good 39 from tilting. The closing means 24 for reversibly connecting and opening the closure device 56 is located in the lower section of the closure device 56 and consists of a holding element 7 including an eyelet 45 with round shape on the front frame 13 and on the rear frame 11 of a reversible closing lock 18, which consists of an electric drive 10 driving a linear movable locking element 8, which includes a beveled tip 59.

The rod-shaped locking element 8 is connected to a hinge 17 with the electric drive 10 and supported in the linear guides 9, which preferably represent linear ball bearings. The electric drive 10 is connected to the electric contacts 14 by an electric line 15. The electric contacts 14 are placed on the suspension device 1 right and left in a mirror-inverted manner with regard to the conveying direction. The electric drive 10 preferably is a low-cost solenoid including spring return and movable rod-formed anchor. The closing of the reversible locking 18 is achieved with the aid of the spring of the electric drive 10 by the locking element 8 travelling into the eyelet 45 of the holding element 7, which at this moment is enclosed between the guides 19. For the opening, the electric drive 10 is switched for a short time, the locking element 8 is removed from the holding element 7, and the reversible closing lock 18 is released, wherein the closure device 56 opens.

In accordance with FIGS. 6 to 8, the transport bag 2 is illustrated in the closure state 21. The front frame 13 and the rear frame 11 are folded together. The locking element 8 is driven into the eyelet 45 of the holding element 7, which is, at this moment, enclosed between the guides 19. The transport bag 2 is in the closure state 21 and ready for receiving conveying good 39.

The front frame 13 forms, in accordance with FIG. 9, a base body 25, including at both sides hinge elements 27 shaped as U-profiles and including hinge bearings 26 for the hinge shaft. The bracket 7 including the eyelet 45 is located in the lower section of the front frame 13. The rear frame 11 forms, in accordance with FIG. 10, a U-shaped frame of U-profile including hinge elements at both sides with hinge bearings 28 for the hinge shaft. The reversible closing lock 18 is located in the lower section of the rear frame 11.

In accordance with FIGS. 11 and 12 the unloading station 49 for the transport bags 2 is illustrated with a closure device 56, which comprises front frame 13 and rear frame 11 being pivotally connected to each other by the hinges 12 and can be folded together. The unloading station 49 serves for unloading the conveying good 39 onto the unloading locations for receiving the unloaded conveying good 39. The unloading station 49 is fixed to the conveying installation, which preferably represents the sorting installation for the transport bags 2. The conveying installation preferably comprises a transport rail 33, manufactured of aluminum, with a box-shaped and symmetrically formed cross section including conveying-element guides 34, the upper limiting webs for the rollers 50, and the travelling webs for the rollers 50. The conveying element 35 is drivable in a circulating manner by means of an electric motor which is not illustrated. The electric motor preferably comprises an acceleration ramp and a deceleration ramp for preventing the axial displacements and the forces produced thereby. The conveying element 35 preferably is a low-cost and commercially available roller chain including pivotable joints. The conveying element 35 includes the driver 36 on the bottom side. The driven transport bags 2 are located beneath the conveying elements 35 in the transport rail 33. The unloading station 49 is fixed to the transport rail 33, and includes switching contacts 31, which are switchable by at least one drive 32 in directions 52, 53 and which are supported in body 30, wherein the switching contacts 31 preferably are spring-loaded carbon-brush contacts, with a corresponding connection to the electrical power grid. For the opening of the closure device 56 for unloading the transport bag 2, the electric drive 10 is switched for a short time, the reversible closing lock 18 is released, the closure device 56 opens, and the conveyer good 39 is unloaded from the transport bag 2. The switching takes place in the unloading station 49 because electrical current is fed to the electric contacts 14 with the aid of the electrical switching contacts 31 of the unloading station 49, which, at the moment of reaching the contacts, are extracted towards the electric contacts 14 in direction 52 with the aid of the drives 32 up to the contact to the electric contacts 14 for establishing an electrical connection to the electric contacts 14 and for switching with electrical current of the electric drive 10, so that the closure device 56 opens and the transport bag 2 is unloaded. The unloading can occur in arbitrary conveying direction, when the electric contacts 14 slide along the switched electrical switching contacts 31, and also when the transport bags 2 are stopped.

The FIGS. 13 to 15 show the closing station 51 for the transport bags 2 with a closure device 56 including front frame 13 and rear frame 11 for detachably connecting the front wall 4 to the rear wall 5 into the closure state 21 for receiving the conveying good 39. The means for locking the closure device 56 include lifting ramp 38 with lateral guiding webs 42 for swiveling up and orientating the open transport bag 2. The open transport bag 2 is guided and displaced, in a centered manner, in direction 37 on the inclination section of the lifting ramp 38 by means of the conveying installation. The conveying installation comprises a transport rail 33 having a box-shaped and symmetrically formed cross section with conveying-element guides 34, with the upper limiting webs for the rollers 50 and the travelling webs for the rollers 50. The conveying element 35 is drivable in a circulating manner by means of an electric motor which is not illustrated. The conveying element 35 includes a driver 36 on the bottom side. The transport bags 2 are located below the conveying elements 35 in the transport rail 33. In the upper section of the lifting ramp 38 the closure device 56 is folded by its own weight due to an inclined position of the transport bag 2, so that the closure device 56 is prepared for locking. At the same time, when the electric contacts 14, i.e. the contact position to the electric switching contacts 31, are reached, the electric switching contacts 31 are activated by the drive 32 and extract in direction 52 for establishing an electrical connection to the electric contacts 14 and for switching with an electrical current of the electric drive 10. The reversible closing lock 18 of the closing means 24 opens, so that the holding element 7 is driven between the guides 19 without resistance. After the electric drive 10 is turned off, the reversible closing lock 18 closes the holding element 7 with the aid of the spring and generates the closure state 21.

In accordance with FIGS. 16 to 21 transport bag 2 is illustrated including a closure device 56, which comprises linear front-closing element 44 and linear rear-closing element 43. The linear front-closing element 44 is fixed to the lower section of the front wall 4, and the linear rear-closing element 43 is oppositely fixed in the lower section of the rear wall 5. The linear front-closing element 44 and the linear rear-closing element 43 include centering means 46, 47, 48 for displacing the linear closing elements 44, 43, in a guided manner, relative to each other into the closure state 21. At least one closing means 24 is provided, preferably two. The closing means 24 comprise, on the linear front-closing element 44 of the closure device 56, a holding element 7, and, on the linear rear-closing element 43 of the closure device 56, the reversible closing lock 18, and are identically structured, as disclosed in the description above in accordance with FIGS. 1 to 5.

FIG. 17 shows an unloading station 49 together with the transport bag 2 including a closure device 56, which includes linear front-closing element 44 and linear rear-closing element 43. The unloading station 49 has the identical structure and characteristics, as disclosed in the description above in accordance with FIGS. 11 and 12.

The FIGS. 22 to 24 show the closing station 51 for the transport bags 2 which include a closure device 56 with linear closing elements 44, 43.

The means for locking the closure device 56 include a lifting ramp 38 with lateral guiding webs 42 for swiveling up and orientating the open transport bag 2, in order to bring it into the closure state 21, because the open transport bag 2 is guided and displaced, in a centered manner, by means of the lateral guiding webs 42 with the conveying installation in direction 37 on the inclination section of the lifting ramp 38. In the upper section of the lifting ramp 38 the transport bag 2 is folded under its own weight due to the inclined position, and the closure device 56 is prepared for locking, which includes the linear closing elements 44, 43 with the centering means 46, 47, 48 for displacing, in a guided manner, the linear closing elements 44, 43 relative to each other. At the same time, when the electric contacts 14 reach the position for contacting the electrical switching contacts 31, the electric contacts 31 are activated by the drive 32 and extract in direction 52 for establishing an electrical connection to the electric contacts 14 and for switching with the electrical current of the electric drive 10. The reversible closing lock 18 of the closing means 24 opens, so that the holding element 7 can travel in-between the guides 19 without resistance, and the closure device 56 is displaced, after turning off the electric drive 10 by the aid of the springs, into the closure state 21.

The loading station 58 is illustrated in accordance with FIG. 25. The loading station 58 serves for erecting and positioning the transport bags 2 at the loading table 40. This is achieved by means of a conveying installation which is not illustrated. After the erection and positioning at the loading table 40, the conveying good 39 is loaded into the transport bag 2 manually, or by means of transport belt. Subsequently, the loaded transport bag 2 is preferably conveyed into the sorting installation for distributing the conveying good 39 onto the unloading stations 49.

In accordance with FIGS. 26 and 27 an accumulation path 41 is shown with empty transport bags 2. The transport bags 2 are stopped by a separation, or stopping devices 61, and travel together in the descent, wherein they fold in conveying direction 37 and thereby produce the maximum density relative to each other at an overall depth L. The suspension device 1 has maximum dimension B and substantially forms the maximum depth of an empty transport bag 2 folded in conveying direction 37, which preferably is greater, so that the overall depth of all transport bags 2, when accumulating the empty transport bags 2, does not exceed a dimension of L=B×number of transport bags 2.

The invention claimed is:

1. A transport bag for a conveying system, the transport bag being configured for receiving conveying good, and including:
   a support wall comprising front wall and rear wall;

a loading frame, which is connected to the support wall, representing an upper loading opening of the support wall for arranging the front wall spaced away from the rear wall;

a suspension device;

a closure device for detachably connecting the front wall to the rear wall into a closure state for receiving the conveying good and for releasing the connection between the front wall and the rear wall from the closure state into an open state for releasing the conveying good downwards;

at least one closing device for reversibly connecting and opening the closure device; and an electric drive, which is an electrically controllable electric traction magnet with a spring return and a linearly movable rod-shaped locking element;

wherein the closing device is operated by the electric drive; and wherein a controller of the electric drive is provided, the controller of the electric drive being electric contacts, which are attached to the transport bag and connected to the electric drive by an electric line for establishing an electric connection to the electric drive.

2. The transport bag of claim 1, wherein
the electric contacts are attached to the suspension device of the transport bag.

3. The transport bag of claim 1, wherein the closure device comprises a front frame and a rear frame being pivotally connected to each other, and being foldable onto each other for the reversible generating of the closure state or the open state of the transport bag, and
wherein the front frame is attached to the front wall and the rear frame is attached to the rear wall.

4. The transport bag of claim 3, wherein the front frame and the rear frame are pivotally connected to each other by hinges.

5. The transport bag of claim 3, wherein
the support wall is formed at least partially of a flexible fabric,
the support wall comprises side walls,
the rear frame is attached with lateral sections to the side walls for securing the conveying good from falling out, and
the closing device is located in a lower section of the closure device.

6. The transport bag of claim 3, wherein
the closing device comprises a reversible closing lock on the rear frame of the closure device,
the reversible closing lock comprises the linearly movable rod-shaped locking element connected to the electric drive and supported in linear guides, and
closing of the reversible closing lock is operated by the spring return of the electric drive and opening is operated by the electric drive.

7. The transport bag of claim 6, wherein
the closing device comprises, on the front frame of the closure device, a holding element having an eyelet, and
when the closure device is folded together, the holding element is positioned such that the linearly movable rod-shaped locking element is movable into the eyelet of the holding element for closing the closure device.

8. A transport bag, the transport bag being configured for receiving conveying good, and including:
a support wall comprising front wall and rear wall;

a loading frame, which is connected to the support wall, representing an upper loading opening of the support wall for arranging the front wall spaced away from the rear wall;

a suspension device;

a closure device for detachably connecting the front wall to the rear wall into a closure state for receiving the conveying good and for releasing the connection between the front wall and the rear wall from the closure state into an open state for releasing the conveying good downwards;

at least one closing device for reversibly connecting and opening the closure device;

an electric drive; and a controller for the electric drive;

wherein the closing device is operated by the electric drive;

wherein the closure device comprises a linear front-closing element and a linear rear-closing element, wherein the linear front-closing element is fixed to a lower region of the front wall and the linear rear-closing element is fixed oppositely in a lower region of the rear wall, wherein centering device are further provided for guided centered displacing closing elements relative to each other into the closure state, wherein the closing device comprises a reversible closing lock on the linear rear-closing element of the closure device, wherein the reversible closing lock comprises a linearly movable rod-shaped locking element connected to the electric drive and supported in linear guides, wherein closing of the reversible closing lock is operated by a return spring of the electric drive and opening is operated by the electric drive, wherein the closing device comprises, on the linear front-closing element of the closure device, a holding element having an eyelet, and wherein, during the displacement of the closing elements relative to each other, the holding element is positioned such that the linearly movable rod-shaped locking element is movable into the eyelet of the holding element for closing the closure device.

9. A transport bag, the transport bag being configured for receiving conveying good, and including:
a support wall comprising front wall and rear wall;
a loading frame, which is connected to the support wall, representing an upper loading opening of the support wall for arranging the front wall spaced away from the rear wall;

a suspension device;

a closure device for detachably connecting the front wall to the rear wall into a closure state for receiving the conveying good and for releasing the connection between the front wall and the rear wall from the closure state into an open state for releasing the conveying good downwards;

at least one closing device for reversibly connecting and opening the closure device;

an electric drive; and a controller for the electric drive;

wherein the closing device is operated by the electric drive;

wherein the closure device comprises a front frame and a rear frame being pivotally connected to each other, and being foldable to each other for reversible generation of the closure state, or the open state, of the transport bag, and wherein the front frame is attached to the front wall, and the rear frame is attached to the rear wall;

wherein the support wall is formed at least partially of a flexible fabric;

wherein the support wall comprises side walls;

wherein the rear frame is attached with lateral sections to the side walls for securing the conveying good from falling out; and wherein the closing device is located in a lower section of the closure device, wherein the closing device comprises a reversible closing lock on the rear frame of the closure device, wherein the reversible closing lock comprises a linearly movable rod-shaped locking element connected to the electric drive and supported in linear guides, and where closing of the reversible closing lock is operated by a return spring of the electric drive and opening is operated by switching off the electric drive.

10. The transport bag of claim 9, wherein the closing device comprises, on the front frame of the closure device, a holding element having an eyelet, and when the closure device is folded together, the holding element is positioned such that the linearly movable rod-shaped locking element is movable into the eyelet of the holding element for closing the closure device.

11. The transport bag of claim 9, wherein the electric drive comprises an electrically controllable magnet, which is an electric traction magnet, with a spring return and the linearly movable rod-shaped locking element.

12. A conveying installation including a transport rail, a conveying element movably supported in the transport rail along a conveying direction with drivers, at least one transport bag supported in the transport rail below the conveying element, wherein the transport bag is configured for receiving conveying good, and includes:

a support wall comprising front wall and rear wall;

a loading frame, which is connected to the support wall, representing an upper loading opening of the support wall for arranging the front wall spaced away from the rear wall;

a suspension device;

a closure device for detachably connecting the front wall to the rear wall into a closure state for receiving the conveying good and for releasing the connection between the front wall and the rear wall from the closure state into an open state for releasing the conveying good downwards;

at least one closing device for reversibly connecting and opening the closure device; and an electric drive, which is an electrically controllable electric traction magnet with a spring return and a movable rod-shaped anchor;

wherein the closing device is operated by the electric drive; and wherein a controller for the electric drive is provided, the controller for the electric drive being electric contacts, which are attached to the transport bag and connected to the electric drive by an electric line for establishing an electric connection to the electric drive;

an unloading station for the at least one transport bag including means for opening the closure device of the at least one transport bag for unloading the conveying good onto the unloading locations, a closing station for the at least one transport bag including means for locking the closure device of the at least one transport bag, a loading station for the at least one transport bags including a loading table for manually, or by a transport belt automatically, transporting the conveying good into the at least one transport bag, and accumulation paths including separations and stopping devices.

13. An unloading station including a transport bag, the transport bag being configured for receiving conveying good, and including:

a support wall comprising front wall and rear wall;

a loading frame, which is connected to the support wall, representing an upper loading opening of the support wall for arranging the front wall spaced away from the rear wall;

a suspension device;

a closure device for detachably connecting the front wall to the rear wall into a closure state for receiving the conveying good and for releasing the connection between the front wall and the rear wall from the closure state into an open state for releasing the conveying good downwards;

at least one closing device for reversibly connecting and opening the closure device; and an electric drive, which is an electrically controllable electric traction magnet with a spring return and a movable rod-shaped anchor;

wherein the closing device is operated by the electric drive; and wherein a control for the electric drive is provided, the control for the electric drive being electric contacts, which are attached to the transport bag and connected to the electric drive by an electric line for establishing an electric connection to the electric drive;

means for opening the closure device, which are electric switching contacts supplied with electric current, and wherein the electric switching contacts generate, when switched, a contact to the electric contacts of the transport bag, and establish an electric connection to the electric drive for switching the electric drive so that the closure device opens and the conveying good is unloaded.

14. A closing station including:

a transport bag, the transport bag being configured for receiving a conveying good, and including:

a support wall comprising front wall and rear wall;

a loading frame, which is connected to the support wall, representing an upper loading opening of the support wall for arranging the front wall spaced away from the rear wall;

a suspension device;

a closure device for detachably connecting the front wall to the rear wall into a closure state for receiving the conveying good and for releasing the connection between the front wall and the rear wall from the closure state into an open state for releasing the conveying good downwards;

at least one closing device for reversibly connecting and opening the closure device; and an electric drive, which is an electrically controllable electric traction magnet with a spring return and a movable rod-shaped anchor;

wherein the closing device is operated by the electric drive; and wherein a controller for the electric drive is provided, the controller for the electric drive being electric contacts, which are attached to the transport bag and connected to the electric drive by an electric line for establishing an electric connection to the electric drive;

means for locking the closure device, which comprise a lifting ramp for swiveling up the transport bag when conveyed in direction in an inclination section of the lifting ramp so that, due to an inclined position of the transport bag, a centered merging of the closure device into the closure state is created, and at the same time the electric contacts are activated for establishing an electric connection to the electric drive using the electric contacts of the transport bag and for opening a reversible closing lock of the closing means so that the closure device is provided for locking, and, after deactivating the drive, the closure state is generated by using the spring return of the electric drive.

* * * * *